No. 894,109.

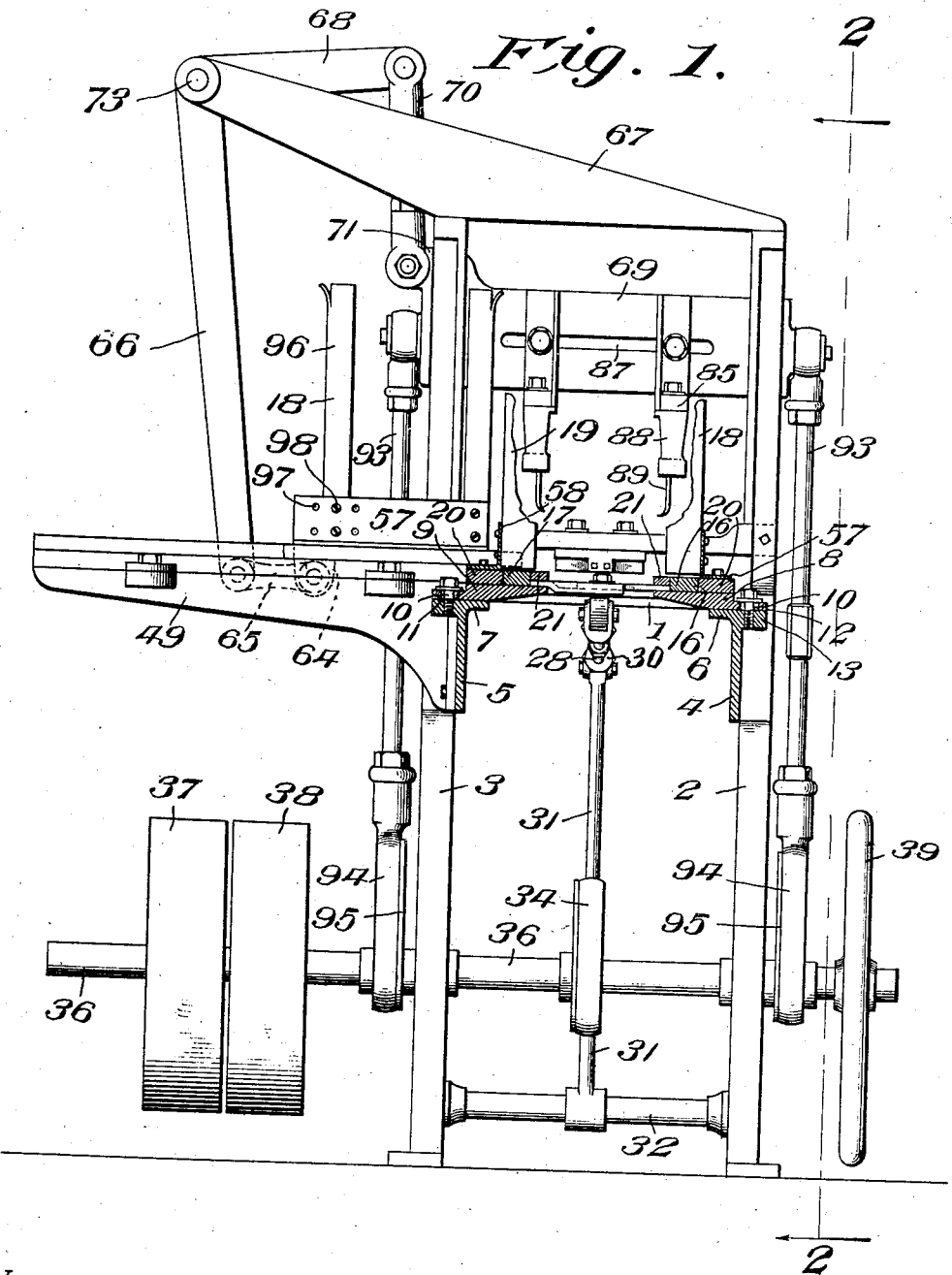

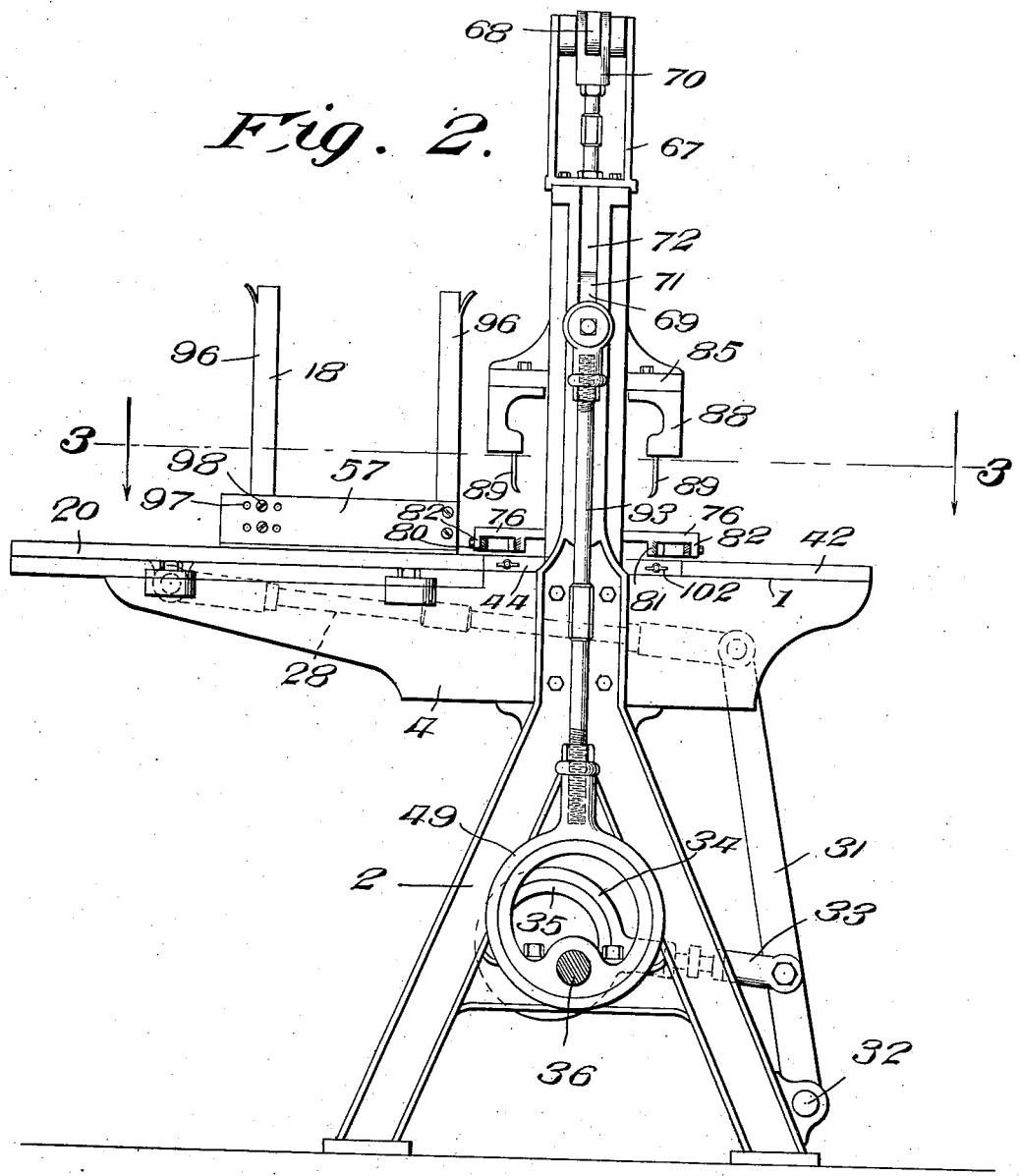

P. L. BILLINGSLEY.

PATENTED JULY 21, 1908.

MACHINE FOR ASSEMBLING PARTS OF BOX ENDS.

APPLICATION FILED AUG. 9, 1907.

7 SHEETS—SHEET 3.

WITNESSES:

INVENTOR
P. L. Billingsley
BY
W. J. FitzGerald & Co.
Attorneys

No. 894,109.

P. L. BILLINGSLEY.

PATENTED JULY 21, 1908.

MACHINE FOR ASSEMBLING PARTS OF BOX ENDS.

APPLICATION FILED AUG. 9, 1907.

7 SHEETS—SHEET 4.

WITNESSES:

INVENTOR
P. L. Billingsley
BY
W. J. FitzGerald
Attorneys

No. 894,109. PATENTED JULY 21, 1908.
P. L. BILLINGSLEY.
MACHINE FOR ASSEMBLING PARTS OF BOX ENDS.
APPLICATION FILED AUG. 9, 1907.
7 SHEETS—SHEET 5.
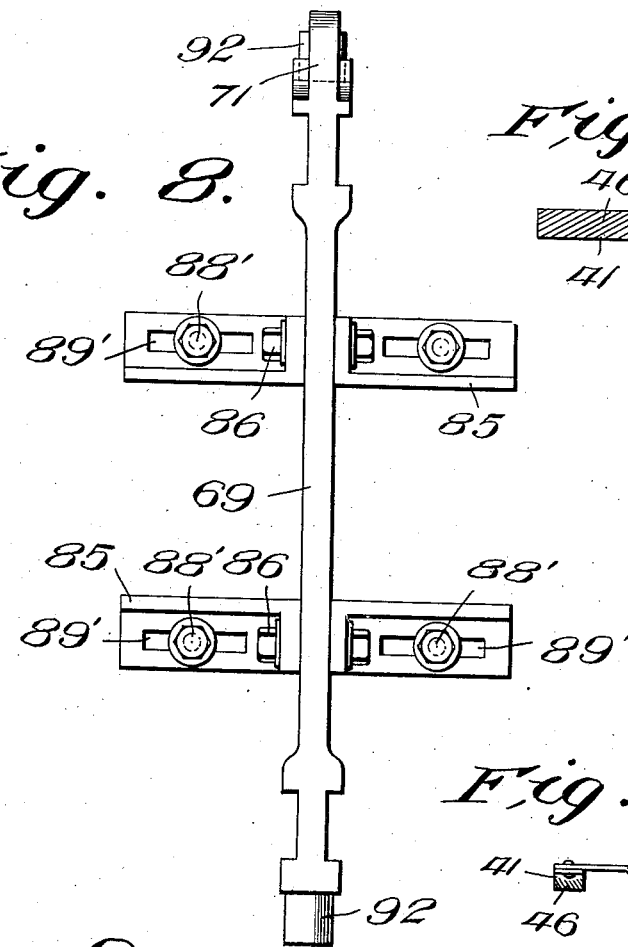
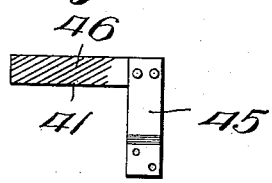
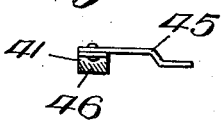
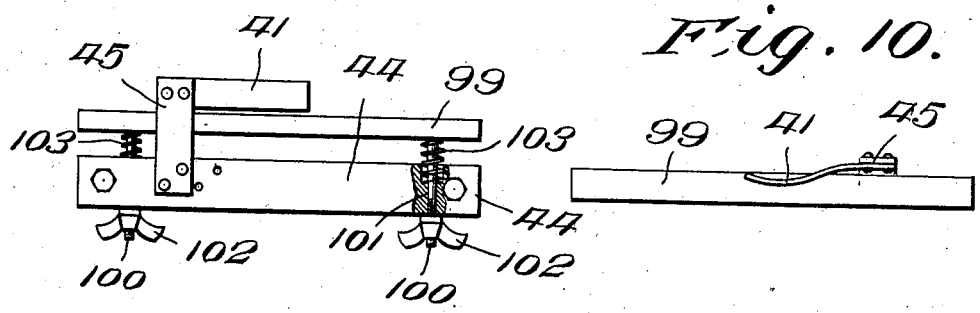
WITNESSES:
INVENTOR
P. L. Billingsley
BY
W. J. FitzGerald
Attorneys No. 894,109.

PATENTED JULY 21, 1908.

P. L. BILLINGSLEY.
MACHINE FOR ASSEMBLING PARTS OF BOX ENDS.
APPLICATION FILED AUG. 9, 1907.

7 SHEETS—SHEET 6.

WITNESSES:

INVENTOR
P. L. Billingsley
BY
W. J. FitzGerald & Co.
Attorneys

No. 894,109. PATENTED JULY 21, 1908.
P. L. BILLINGSLEY.
MACHINE FOR ASSEMBLING PARTS OF BOX ENDS.
APPLICATION FILED AUG. 9, 1907.
7 SHEETS—SHEET 7.
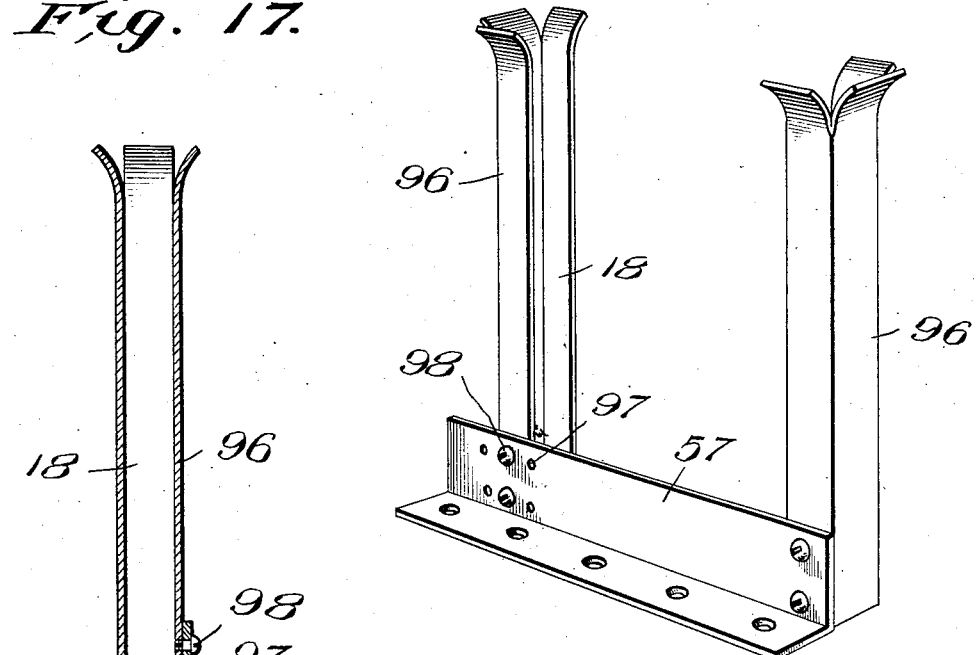
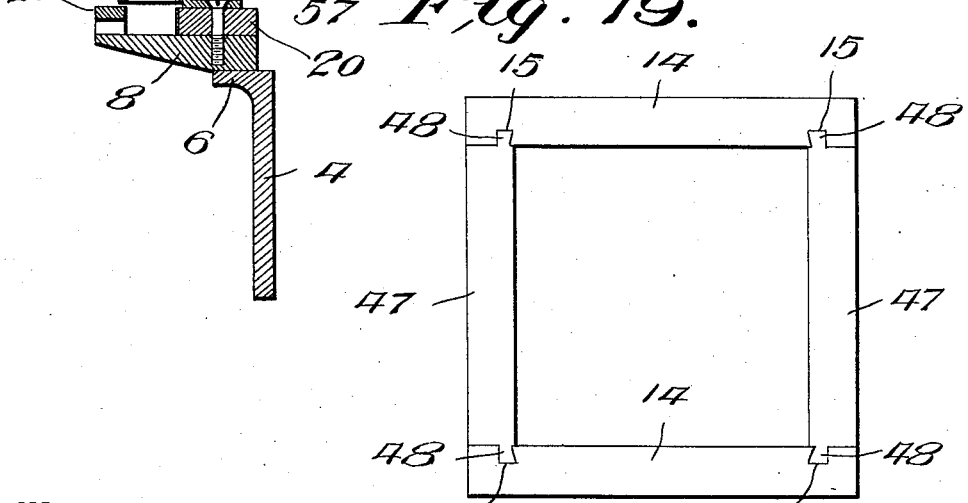
WITNESSES:
INVENTOR
P. L. Billingsley
BY
W. J. FitzGerald
Attorneys

UNITED STATES PATENT OFFICE.

PERCY L. BILLINGSLEY, OF OAK, FLORIDA.

MACHINE FOR ASSEMBLING PARTS OF BOX ENDS.

No. 894,109.    Specification of Letters Patent.    Patented July 21, 1908.

Application filed August 9, 1907. Serial No. 387,906.

*To all whom it may concern:*

Be it known that I, PERCY L. BILLINGSLEY, a citizen of the United States, residing at Oak, in the county of Marion and State of Florida, have invented certain new and useful Improvements in Machines for Assembling Parts of Box Ends; and I do hereby declare the following to be a full, clear, and exact description of the invention, such as will enable others skilled in the art to which it appertains to make and use the same.

My invention relates to machines for assembling parts of box ends and my object is to provide means for placing prepared strips of material in position on the bed of the machine to be assembled together.

A further object is to provide means for assembling the members after they have been placed in position over the bed of the machine.

A further object is to provide means to properly center the members, whereby the parts thereof will be in registration with each other.

A still further object is to provide means for adjusting the several parts of the machine, whereby members of different lengths may be operated upon.

Other objects and advantages will be hereinafter referred to and more particularly pointed out in the claims.

Figure 4:
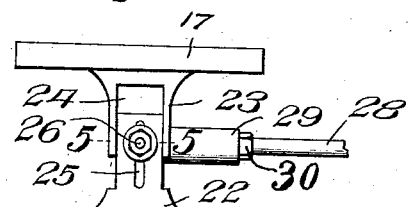
Figure 5:
Figure 3:
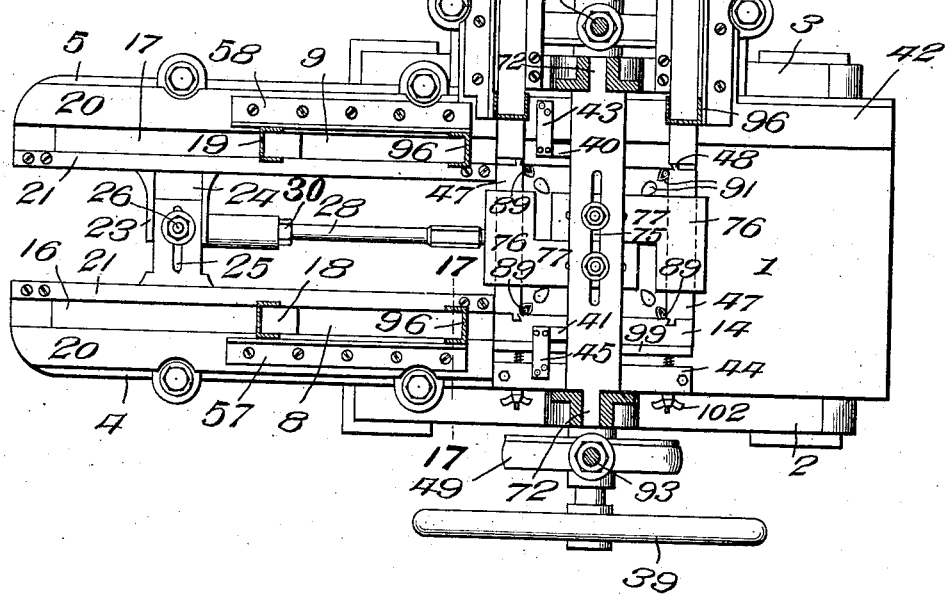
Figure 6:
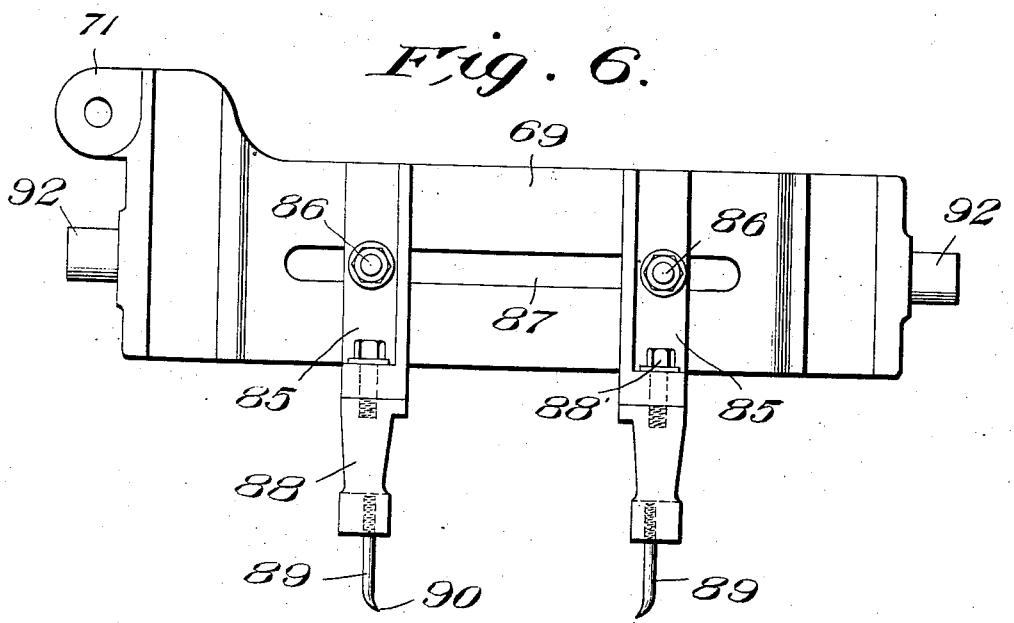
Figure 7:
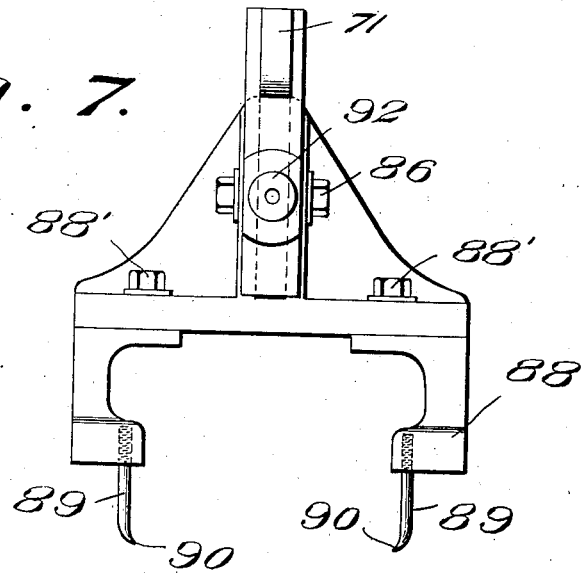
Figure 15:
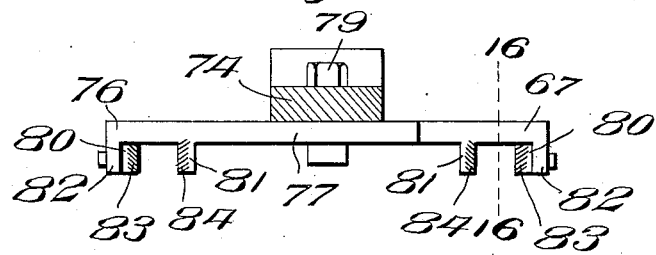
Figure 14:
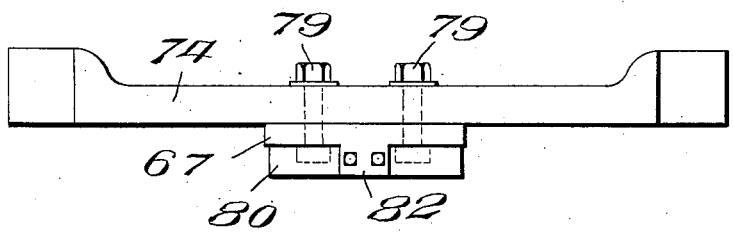
Figure 13:
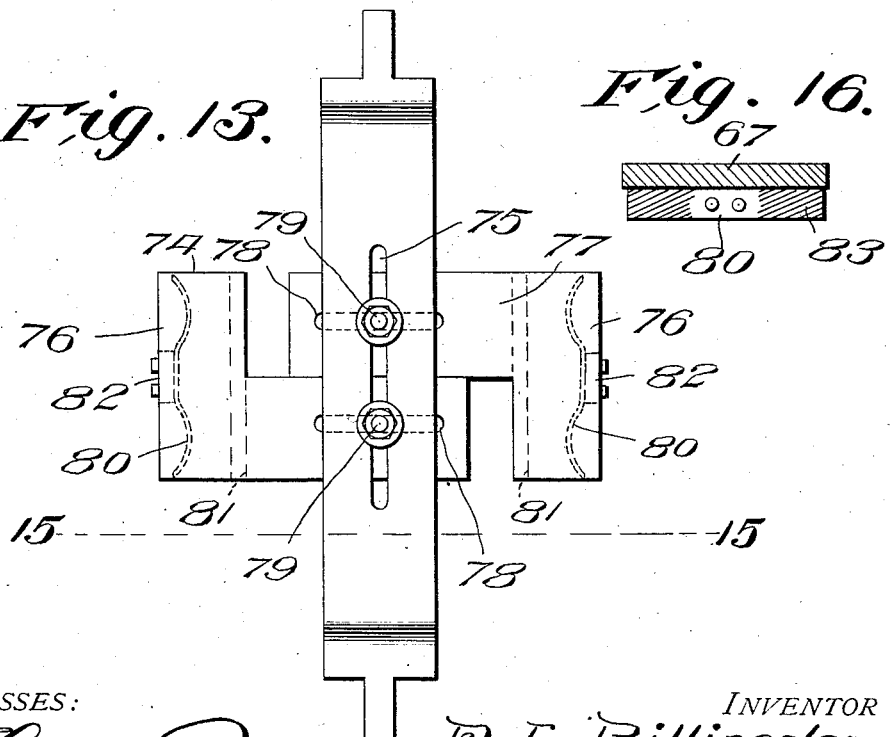
Figure 16:
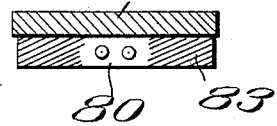

In the accompanying drawings which are made a part of this application, Figure 1 is an end elevation of the machine showing portions thereof in section and other parts broken away. Fig. 2 is a side elevation of the machine, as seen from line 2—2, Fig. 1. Fig. 3 is a sectional view, as seen on line 3—3, Fig. 2. Fig. 4 is a detail plan view of one of the plungers employed in connection with the machine. Fig. 5 is a detail, sectional view thereof, as seen on line 5—5, Fig. 4. Fig. 6 is a side elevation of the cross head and component parts employed in assembling the members forming the box head. Fig. 7 is an end elevation thereof. Fig. 8 is a top plan view thereof. Fig. 9 is a plan view of a guide employed for guiding a portion of the members on the bed plate of the machine. Fig. 10 is an edge elevation thereof. Fig. 11 is an edge elevation of a spring finger employed in connection with the guide. Fig. 12 is a bottom plan view thereof. Fig. 13 is a top plan view of a guide head and component parts carried thereby. Fig. 14 is a side elevation thereof. Fig. 15 is a sectional view as seen on line 15—15, Fig. 13. Fig. 16 is a sectional view as seen on line 16—16, Fig. 15. Fig. 17 is a sectional view through one of the member-holding magazines and parts of the machine to which the same is secured. Fig. 18 is a perspective view of one of the magazines complete, and, Fig. 19 is a plan view of the members forming the end of the box, in their assembled position.

In building boxes or crates for shipping oranges, pine-apples, and like fruits, the walls of the boxes are formed of thin sheets of wood or veneer, thereby reducing the amount of lumber required for forming the boxes, and, at the same time, producing a very light weight article and in order to strengthen the box and prevent the same from becoming racked or broken in shipping, a frame is provided for the heads of the box, to which the strips of veneer are secured in any preferred manner, as by nailing. It has been the custom heretofore in preparing these frames to provide the ends of two of the members forming the frame with tongues and the ends of the opposite members with grooves to receive the tongues, thereby requiring that the members be nailed or bolted together after the tongues have been entered in the sockets, but it has been found that by providing substantially dovetail mortises in the inner edges of two of the members and inserting therein correspondingly formed tenons on the ends of the opposite members, the several members may be rigidly secured together without employing nails or bolts, after the parts are assembled and to save time and labor in assembling the several members forming the frame, the machine herein shown and described has been constructed.

In accomplishing the proper assemblage of the several parts, it is necessary to first place two of the members in position on the bed plate of the machine and introduce the opposite members over the bed plate and above the members on the bed plate, when a cross head is lowered into engagement with the members above the bed plate, which will result in lowering said members and directing the tenons thereon into the grooves in the opposite members, thereby assembling the several parts and forming a frame and to accomplish this result, I provide a bed plate 1, which is secured in any preferred manner between a pair of standards 2 and 3. The bed plate 1 is provided along each edge with depending flanges 4 and 5, said flanges being extended a distance beyond one end of the bed plate and provided at their upper edges with inwardly extended ledges 6 and 7, respectively, on which are adapted to rest slide plates 8 and 9, respectively, which are secured in position on the ledges 6 and 7 by means of bolts, or the like, 10, said bolts extending through slots 11 in ears 12 on the slide plates and threaded into coöperating ears 13 on the ledges 6 and 7, thus providing means for adjusting the slide plates laterally.

In assembling the box ends as previously set forth, two of the members 14, forming two sides of the frame, are moved endwise onto the bed plate 1, between the standards 2 and 3 and, in this instance, said members are provided on their inner edges with dovetail notches 15, and in order to readily accomplish this result, plungers 16 and 17 are mounted on the slide plates 8 and 9, respectively, and reciprocate below magazines 18 and 19 carried above the plungers 16 and 17, respectively. The plungers 16 and 17 are held against lateral movement, by securing to the upper faces of the slide plates 8 and 9 and at opposite sides of said plungers, guide rails 20 and 21. The plungers 16 and 17 are adjustably secured together by means of over-lapping reach bars 22 and 23, respectively, the reach bar 23 having a seat 24 in its upper surface, in which takes the free end of the bar 22, said bar 22, having an elongaged slot 25, through which extends a binding bolt 26 and by which means the two reach bars are adjustably secured together.

The lower end of the bolt 26 is provided with ears 27, between which extends the upper end of a reciprocating rod 28, the end of said rod entering a socket 29, so that the length of said rod may be increased or decreased, as desired, a lock nut 30 being threaded upon the rod 28 to hold said rod in its adjusted position. The opposite end of the rod 28 is pivotally secured to the upper end of the lever 31, which is in turn pivotally secured at its lower end to a shaft 32, carried in suitable bearings on the standards 2 and 3. Secured to the lever 31, at a point between its longitudinal center and the rod 32, is an eccentric shaft 33, which is in turn secured to an eccentric strap 34, secured in the usual or any preferred manner to an eccentric 35. The eccentric 35 is fixed to a driving shaft 36, which extends laterally below the bed plate 1 and beyond the standards 2 and 3, one end of said driving shaft being provided with the usual form of pulleys 37 and 38, one of which is a driving pulley and the other an idler, while the opposite end of the shaft 36 is provided with a hand wheel 39, through which means the parts of the machinery may be propelled manually when desired. By this construction it will be seen that when power is applied to the shaft 36, the eccentric will cause the lever 31 to swing upon its pivot point 32, thereby moving the plungers 16 and 17 longitudinally on the slide plates 8 and 9 and as the magazines 18 and 19 carry a plurality of the members 14, said members will be successively fed onto the bed plate 1, the members descending by their own weight as soon as the plungers have been moved rearwardly from below the magazines.

The members 14, in passing onto the bed plate 1, are entered below spring fingers 40 and 41, the spring finger 40 being secured to a guide strip 42, extending along one edge of the bed plate 1, by means of a strap 43, while the spring finger 41 is secured to a block 44 at the opposite edge of the bed plate, by means of a strap 45, said fingers extending at right angles to their respective straps and having their free ends curved and bent downwardly. The lower faces of the fingers 40 and 41 are provided with a plurality of serrations 46, which are at a tangent to the path of the members 14, so that when said members are engaged by the fingers, the serrations will cause the members 14 to move outwardly and firmly against their respective guides, thereby placing and holding said members in position to coöperate with a pair of members 47 employed for forming the opposite sides of the frame. These members 47 are provided at each end with tenons 48, which are adapted to register with the notches 15 in the edges of the members 14 and in order to place the members 47 in position to allow the tenons 48 to enter the notches in the members 14, said members are placed over the bed plate 1 at right angles to the members 14 and above the same and in order to accomplish this result, flanges 49 and 50 are secured to the face of the flange 5 and extend at right angles thereto, said flanges being on opposite sides of the standard 3 and have mounted thereon slide plates 51 and 52, similar to the slide plates 8 and 9, upon which are mounted plungers 53 and 54, said plungers moving longitudinally below magazines 55 and 56, which are extended upwardly from the slide plates. The magazines 18 and 19 and 55 and 56 are held in position by means of angle plates 57 and 58 and 59 and 60, respectively, one section of said angle plates 57 and 58 being secured to the guide rails 20, while the angle plates 59 and 60 are secured to the guide rails 61 on the slide plates 51 and 52.

The plungers 53 and 54 are secured together by means of reach bars 62, said reach bars being constructed similar to the reach bars connecting the plungers 16 and 17, the binding bolt 63, in this instance, also having ears 64 at its lower end, between which is pivotally secured a link 65. The plungers 53 and 54 are moved longitudinally on their respective slide plates by means of an L-shaped rocking beam 66, one end of the body portion of said rocking beam being pivotally secured to the outer end of the link 65, while the opposite end thereof is pivotally secured to a bracket 67, extending upwardly and outwardly from the upper ends of the standards 2 and 3, the angular extension 68 of the rocking beam being in turn pivotally connected to a cross head 69, by means of an adjustable connecting rod 70, one end of said cross head 69 having a lip 71, to which the lower end of the rod 70 is secured. The cross head 69 is slidably mounted in ways 72 in the upper ends of the standards 2 and 3, so that as the cross head is moved upwardly and downwardly, the beam 66 will be rocked on its pivot point 73, which will result in moving the plungers 53 and 54 longitudinally on their respective slide plates and, thereby, feeding the members 47 in position to be connected with the members 14.

Secured between the standards 2 and 3 and above the bed plate 1 is a guide head 74, which is provided at its central portion with a longitudinally disposed slot 75. Secured to the lower face of the guide head 74 are member receiving heads 76, said heads extending longitudinally of the guide head 74 and are each provided with a shank 77, which extends at right angles to the head 76 and at a point adjacent the ends of the head, said shanks being substantially one-half the width of the heads, so that when the shanks are secured in position on the guide head 74, the shanks will parallel each other and the ends thereof engage the projecting ends of the receiving head 76. Each of the shanks 77 is provided with a slot 78, which slots extend at right angles to the slot 75 and the shanks are clamped in position on the guide head, by introducing locking bolts 79 through the slots 78 and 75 and by arranging the slots as shown, it will be seen that the heads 76 may be adjusted both laterally and longitudinally, thereby disposing the same in position to receive members of various lengths.

The members 47, in leaving the slide bars 51 and 52, pass below the receiving heads 76 and between spring fingers 80 on the outer edges of the receiving heads 76 and guide strips 81 on the inner edges of the receiving heads, the spring fingers 80 being secured at their central portion to depending lugs 82 carried by said receiving heads, the ends of the spring fingers 80, at each side of the lugs 82, being curved inwardly so as to positively clamp the members 47 while passing between the spring fingers and guide strips and in order to positively retain the members 47 between the guide strips and fingers and prevent the same from dropping down as they are being moved inwardly by their respective plungers, the inner faces of the curved portions of the spring fingers 80 and the inner faces of the guide strips 81 are provided with upwardly inclined serrations 83 and 84, respectively, said serrations engaging the edges of the members 47 and causing said members to travel upwardly as they are introduced between the spring fingers and guide strips. The serrations on the spring fingers and guide strips also serve to slightly bind on the members 47, thereby preventing the members from being moved inwardly by their respective plungers.

After the members 14 and 47 have been properly located upon the bed plate 1, the members 47 are forced downwardly and the tenons 48 entered in the notches 15 and to readily accomplish this result, frames 85 are adjustably secured to the cross head 69 by means of bolts 86 extending through said frames and through an elongated slot 87 in the cross head 69, said frames extending at right angles to the axial plane of the cross head and at equal distances to each side thereof. Secured to the lower faces of the extended ends of the frames 85, are assembling plungers 88, which are adapted to engage the members 47 when the cross head 69 makes its downward stroke and force the tenons on the members 47 into the notches 15 of the members 14, the stroke of the plungers 88 being such as to lower the members 47 until the faces thereof are flush with the faces of the members 14. The assembling plungers 88 are adjustably secured to the frames 85, by introducing bolts 88' through slots 89' in the ends of the frames 85, the lower ends of said bolts being threaded into the plungers.

If, for any reason, the tenons 48 should be slightly out of registration with the notches 15, the plungers 88 are each provided with a depending prong 89, which prongs are so arranged as to register with the corners of the frame, formed by the members 14 and 47 and should any of said members be slightly out of alinement, the prongs will positively aline the several members and hold the same in alinement while the members 47 are being lowered by the plungers 88.

The lower ends 90 of the prongs 89 are curved inwardly, so that the free ends of the prongs will not engage the upper surfaces of the members, as the prongs are descending and to allow the plungers to descend their full stroke, the bed plate 1 is provided with a plurality of cavities 91, into which the lower ends 90 of the prongs 89 extend, when the plungers 88 are at their lowermost stroke. The ends of the cross head 69, extending beyond the standards 2 and 3, are provided with stub shafts 92, to which are pivotally secured to upper ends of eccentric rods 93, said shafts being preferably formed in sections and telescopically secured together, so that the ends of said rods may be adjusted as desired. The lower ends of the rods 93 are provided with eccentric straps 94, which are in turn operatively secured to eccentrics 95, fixed to the driving shaft 36. By this construction it will be seen that when the driving shaft 36 is rotated, the cross head 69 will be raised and lowered through the medium of the eccentrics 95 and rods 93.

In operation, a plurality of members 14 are placed in the magazines 18 and 19 and a plurality of the members 47 in the magazines 55 and 56, said magazines being preferably constructed from channel irons 96, each magazine consisting of two sections of the channel iron, which rest in a vertical position and are secured to their respective angle plates 57, 58, 59 and 60 and are spaced a suitable distance apart to receive the respective members therebetween, said members resting in a horizontal position, and, as the machine is adapted to assemble members of various lengths, the sections at one end of the angle plates are adjustably secured thereto by providing said angle plates with a series of openings 97, through which take screws, or the like, 98, and by which means the sections 98 are secured to the angle plates. After the magazines are properly filled, power is applied to the driving shaft 36, which, when the parts of the machine are properly set, will result in first moving the plungers 16 and 17 inwardly, said plungers engaging the lowermost members 14, and driving the same endwise onto the bed plate 1 and below the fingers 40 and 41, respectively, one of said members being moved into engagement with the guide strips 42, while the opposite member is moved into engagement with a yielding, adjustable strip 99, said adjustable strip being placed in front of the block 44 and is held in position by means of bolts 100, which are carried by the strip 99 and extend loosely through bores 101 in the block 44, the extreme outer ends of the bolts being threaded to receive wing nuts 102. The bolts 100 are greater in length than the thickness of the block 44, so that the strip 99 may be moved a distance from the block, and in order to yieldingly hold the strip 99 in its adjusted position, a spring 103 is placed around each of the bolts 100, between the block 44 and strip 99, the tension of said springs being sufficient to normally hold the strip 99 in its extended position.

As the plungers 16 and 17 are moving inwardly, the cross head 69 is on its upward movement, which will result in moving the depending end or body portion of the rocking beam 66 inwardly and disposing two of the members 47 from the magazines 55 and 56 into engagement with the spring fingers 80 and guide strips 81 on the receiving head 76 and above the members 14, the parts operating the two sets of plungers, being so timed that the forward stroke of the plungers 16 and 17 will have been practically completed, by the time the plungers 53 and 54 are finishing their outward stroke and the movement of the plungers 53 and 54 are so timed that they will have completed their inward stroke, by the time the cross head 69 has completed its upward stroke. As soon as the plungers 53 and 54 have completed their inward stroke, the cross head 69 descends, whereupon the assembling plungers 85 will engage the members 47 and force the same downwardly, thereby entering the tenons on said members in the notches formed in the oppositely disposed members 14, the prongs 89, resting in the corners of the frame at the time the cross head completes its downward stroke. As the cross head 69 again starts on its upward movement, a new set of members 14 are moved inwardly by the plungers 16 and 17, the inner ends of said members engaging the frame, produced by securing together the two sets of members, and forcing the same to one side or from below the cross head 69, the strip 99, in this instance, yielding sufficiently to allow the frame to readily move from position between the standards.

It will thus be seen that I have provided mechanical means for quickly and successively securing the members together, forming the same into a frame, thereby increasing the output of the frames and materially decreasing the cost thereof. It will further be seen that by securing the members together in the manner described, the employment of nails or like devices, for securing the members together, will be dispensed with and at the same time produce a stronger and better frame.

What I claim is:

1. A machine for forming frames for box ends, comprising the combination with a bed plate and a plurality of magazines at one end and one side of the bed plate, adapted to hold a plurality of members and deliver them in pairs, one pair being in a plane above the other pair; of means to dispose said members in position to be assembled together on said bed plate.

2. A machine of the class described, comprising the combination with a bed plate and magazines at one end and one side of said bed plate arranged in pairs and at right angles to each other, said magazines being adapted to hold members; of plungers arranged in pairs and coöperating with said magazines, means to move said plungers longitudinally, whereby the members will be placed in pairs over said bed plate, one pair being in a plane above the opposite pair and at right angles thereto and means to assemble said members together, whereby a frame will be formed.

3. In a machine of the class described, the combination with a bed plate, magazines adjacent said bed plate, said magazines holding frame-forming members, and plungers adapted to move said members in position over the bed plate to be assembled; of guides for said members, spring fingers adapted to engage said members and inclined means on said fingers adapted to move said members towards the guides.

4. In a machine of the class described, the combination with a bed plate; of a pair of magazines adjacent one end of said bed plate, a similar pair of magazines extending at right angles to the first-mentioned magazines and their bottoms in a plane above the same, plungers adapted to move endwise below said magazines, whereby members will be moved to a point over said bed plate, means to hold the members from the first-mentioned magazines upon said bed plate, additional means to hold the members from the second-mentioned magazines above the members from the first-mentioned magazines and a plurality of assembling plungers, adapted to direct portions of the suspended members in engagement with the members on the bed plate.

5. In a machine of the class described, the combination with a bed plate, having flanges thereon; of slide plates, adjustably secured to said flanges, said slide plates being arranged in pairs and extending at right angles to each other, plungers slidably mounted on said slide plates, means to adjustably connect said plungers in pairs, magazines arranged in pairs, and above said plungers, said magazines being adapted to hold frame forming members, guides on said bed plate adapted to receive the members from one pair of magazines, spring fingers adapted to engage said members, means on said fingers adapted to direct the members against the guides, a guide head above said bed plate, member receiving heads adjustably secured to said guide head, guide strips depending from said heads, spring fingers secured to said heads, means on said spring fingers and guide strips to move the members from the opposite set of magazines against the lower face of the member receiving heads, means to operate said plungers and additional means to force said members into coöperative relation with each other.

6. In a machine of the class described, the combination with a bed plate, magazines adapted to hold frame-forming members, and means to dispose said members over the bed plate in pairs, one pair being suspended above the other; of assembling plungers vertically movable above said members, registering prongs on said plungers, and means to lower said plungers, whereby said members will be pressed into coöperative relation with each other.

7. In a machine of the class described, the combination with a bed plate, supporting standards therefor, said supporting standards having ways in their upper ends; of a pair of plungers in alinement with the upper surface of said bed plate, member holding magazines above said plungers, means to move said plungers longitudinally below said magazines and deliver two of the members onto the bed plate, a similar pair of plungers at one side of said bed plate and in a plane above the upper surface thereof, member-holding magazines above said plungers, a rocking beam connected to the last mentioned plungers, means to operate said rocking beam, whereby the members from the second mentioned magazines will be moved inwardly and over the members from the first-mentioned magazine, a supporting device for said members and means adapted to engage said suspended members and direct portions thereof into engagement with the members on the bed plate, whereby a frame will be formed.

8. In a machine of the class described, the combination with a bed plate, supporting standards therefor, a plurality of slide plates on said bed plate, plungers slidably mounted on said slide plates, magazines above said plungers, adapted to hold frame-forming members, means to alternately reciprocate said plungers, whereby the members from the magazines will be placed in position over said bed plate to be assembled, one set of said members being in a plane above the opposite set, a cross head slidably mounted in the upper ends of said standards, means to operate said cross head, assembling plungers adjustably secured to said cross head, depending prongs on said assembling plungers, adapted to engage and hold said members in registration with each other, said assembling plungers engaging and assembling said members when the cross head is lowered.

9. In a machine of the class described, the combination with a bed plate having flanges thereon, slide plates adjustably secured to said flanges and extending from one end of the bed plate, similar flanges secured to one of said flanges on the bed plate and extending at right angles thereto, slide plates adjustably secured to the last mentioned flanges, a pair of plungers slidably mounted on each set of slide plates, reach bars extending inwardly, from said plungers, one of said reach bars having a seat therein to receive the end of the opposite reach bar and the opposite reach bar having a slot, a binding bolt extending through said reach bars, by which means the reach bars are adjustably secured together, ears on the lower end of said binding bolts and means pivotally secured between said ears, adapted to move said plungers longitudinally on the slide plates.

10. In a machine of the class described, the combination with a bed plate, supporting standards therefor, and means to move frame-forming members in position to be assembled, a pair of said frame-forming members being at right angles and in a plane above the opposite pair of members; of a guide head supported between said standards and above the bed plate, said guide head having a longitudinal slot therein, a pair of member receiving heads carried by the guide head and extending longitudinally therewith and at opposite sides thereof, shanks at right angles to said receiving heads and fixed thereto, said shanks having slots therein at right angles to the slot in the guide head, locking bolts extending through the slots in the shanks and the slot in the guide head, whereby the member receiving heads may be adjusted on the guide head, guide strips at the inner edges of said receiving heads, a lug at the outer edge of said receiving heads, spring fingers fixed to said lugs, the free ends of said spring fingers being curved inwardly, a plurality of upwardly inclined serrations on the inner faces of said strips and fingers, adapted to engage and move the members upwardly against the lower face of the receiving heads and means to depress the members supported by the receiving heads and inter-locking the same with the members on the bed plate.

11. In a machine of the class described, the combination with a bed plate, having supporting standards therefor, means to direct frame-forming members in pairs over said bed plate, one pair being at right angles to the opposite pair and means to support one pair of said members above the opposite pair; of a cross head vertically, slidably mounted in the upper ends of said standards, assembling plungers adjustably mounted on said cross head, alining prongs on said assembling plungers, and means to lower said cross head, whereby the suspended members will be lowered and parts thereof inter-locked with the members on the bed plate.

12. In a machine of the class described, the combination with a bed plate, supporting standards therefor, having ways in their upper ends, a cross head slidably mounted in said ways, a driving shaft, eccentrics on said driving shaft and rods connecting said eccentrics with the cross head; of two sets of plungers, located at the end and one side of the bed plate, respectively, a reciprocating rod secured to the plungers at the end of the bed plate, a lever pivotally secured at one end to said reciprocating shaft and at its opposite end to said standards, an eccentric on said driving shaft, an eccentric rod between said eccentric and lever, whereby when the driving shaft is rotated, the plungers at the end of the bed plate will be operated, a bracket extending laterally from the upper ends of said standards, a rocking beam pivotally mounted on said bracket, means to pivotally secure the lower end of said rocking beam to the plungers, at the side of the bed plate and a rod connecting the opposite end of said rocking beam to the cross head, whereby when said cross head is raised and lowered, the plunger at the side of the bed plate will be operated.

13. A machine for assembling the members of composite box ends, comprising a bed plate, means to dispose two of the members in a separated position on said bed plate from one end thereof and parallel to each other and additional means to bring an additional pair of members from a different plane and from one side of the bed plate and place them in position to be assembled with the members on the bed plate.

14. A machine for assembling members of box ends, comprising a bed plate, a guide head above said bed plate, means to dispose one pair of members of a box end on said bed plate and additional means to bring the other pair of members from a different plane and dispose them in engagement with said guide head and in position to be assembled with the members on the bed plate.

15. In a machine for assembling the members of a composite box end, comprising the combination with a bed plate; of suitable means for bringing one pair of members into position thereon from one end of the bed plate, and additional means to bring the other pair from one side of the bed plate and from a higher or lower plane and dispose the same in position to be assembled with the pair already placed in position.

In testimony whereof I have signed my name to this specification in the presence of two subscribing witnesses.

PERCY L. BILLINGSLEY.

Witnesses:
 GEO. STUART,
 J. H. HARVEY.